United States Patent
Van Wiemeersch et al.

(10) Patent No.: US 9,199,606 B1
(45) Date of Patent: Dec. 1, 2015

(54) DETECTING VEHICLE DOOR AJAR USING INTRUSION SENSOR

(71) Applicant: Ford Global Technologies, LLC, Dearborn, MI (US)

(72) Inventors: John Robert Van Wiemeersch, Novi, MI (US); Karl William Wojcik, Sterling Heights, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 14/278,161

(22) Filed: May 15, 2014

(51) Int. Cl.
*B60R 25/10* (2013.01)

(52) U.S. Cl.
CPC .................................. *B60R 25/1004* (2013.01)

(58) Field of Classification Search
CPC .................................................. B60R 25/1004
USPC ............. 340/426.2, 426, 28, 426.22, 426.24, 340/426.26, 426.1, 425.5, 438
See application file for complete search history.

(56) References Cited

U.S. PATENT DOCUMENTS

| | | | |
|---|---|---|---|
| 4,517,556 A | | 5/1985 | Saul et al. |
| 4,929,925 A | * | 5/1990 | Bodine et al. ............ 340/426.25 |
| 5,003,290 A | | 3/1991 | Lindquist et al. |
| 5,070,442 A | | 12/1991 | Syron-Townson et al. |
| 5,317,303 A | | 5/1994 | Ross et al. |
| 5,389,911 A | | 2/1995 | Madau |
| 5,483,219 A | * | 1/1996 | Aoki et al. ............... 340/426.26 |
| 5,856,778 A | * | 1/1999 | Kani et al. ............... 340/426.26 |
| 2006/0164289 A1 | * | 7/2006 | Nakagawa et al. ............ 342/28 |
| 2012/0050021 A1 | * | 3/2012 | Rao et al. .................. 340/425.5 |

* cited by examiner

*Primary Examiner* — Brent Swarthout
(74) *Attorney, Agent, or Firm* — Frank MacKenzie; Bejin Bieneman PLC

(57) ABSTRACT

A vehicle includes an intrusion sensor configured to detect a Doppler shift in a passenger compartment and output an intrusion signal representing the Doppler shift. The vehicle further includes a processing device configured to receive the intrusion signal and activate an alarm if the Doppler shift exceeds a predetermined threshold. A method includes measuring a Doppler shift in a passenger compartment of a vehicle, comparing the Doppler shift to a predetermined threshold, and activating an alarm system if the Doppler shift exceeds the predetermined threshold.

18 Claims, 2 Drawing Sheets

DETECTING VEHICLE DOOR AJAR USING INTRUSION SENSOR

BACKGROUND

Even when turned off, vehicles perform various actions, at least some of which require a current draw from the battery. This draw is referred to as the "key-off load." One way to reduce the key-off load is to reduce the number of devices that draw current while the vehicle is off. Doing so, however, typically means giving up premium vehicle features. An alternative approach is to install a larger battery to handle the increased current. However, larger batteries are often associated with increased vehicle costs, increased weight, and reduced fuel economy.

DETAILED DESCRIPTION

An exemplary vehicle includes an intrusion sensor configured to detect a Doppler shift in a passenger compartment and output an intrusion signal representing the Doppler shift. The vehicle further includes a processing device configured to receive the intrusion signal and activate an alarm if the Doppler shift exceeds a predetermined threshold. Several events, such as an occupant remaining in the vehicle, the opening one or more doors or a vent, or breaking one or more windows, may generate a Doppler shift in the passenger compartment. The predetermined threshold may be set to detect Doppler shifts caused by such actions that suggest an unauthorized intrusion into the vehicle. Accordingly, other sensors, such as door ajar sensors, may be turned off during a key-off cycle without sacrificing the intrusion-detection features offered by such sensors. Turning off the door ajar sensors, and potentially other sensors, may reduce the key-off load, thus allowing for a smaller battery to be used in the vehicle.

The vehicle and system shown in the FIGURES may take many different forms and include multiple and/or alternate components and facilities. The exemplary components illustrated are not intended to be limiting. Indeed, additional or alternative components and/or implementations may be used.

Figure 1:
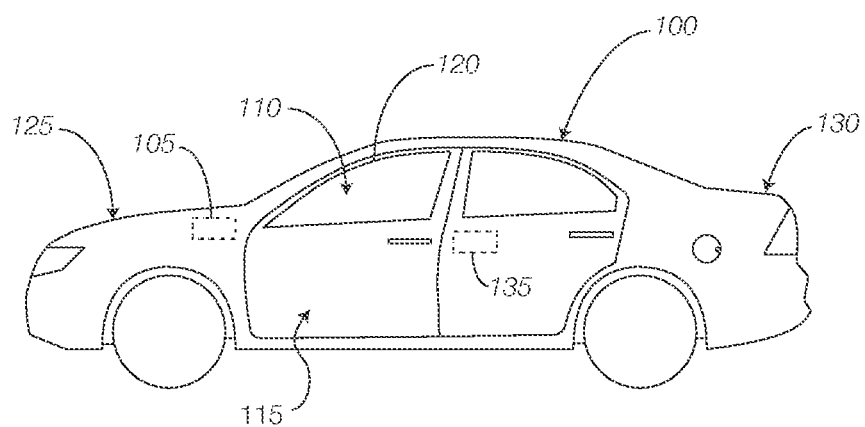
FIG. 1 illustrates an exemplary vehicle configured to use an intrusion sensor to detect whether a vehicle door is ajar.

As illustrated in FIG. 1, the vehicle 100 includes an intrusion detection system 105 that can detect a Doppler shift in the passenger compartment 110 caused by various acts that suggest unauthorized vehicle 100 access. Examples of such acts may include opening a door 115, breaking a window 120 including any side window, rear window, sunroof, or windshield, opening a liftgate of an SUV, Van or Cross-Over or the like. Although illustrated as a sedan, the vehicle 100 may include any passenger or commercial vehicle such as a car, a truck, a sport utility vehicle, a taxi, a bus, etc. In some possible approaches, as discussed below, the vehicle 100 is an autonomous vehicle configured to operate in an autonomous (e.g., driverless) mode, a partially autonomous mode, and/or a non-autonomous mode.

Figure 2:
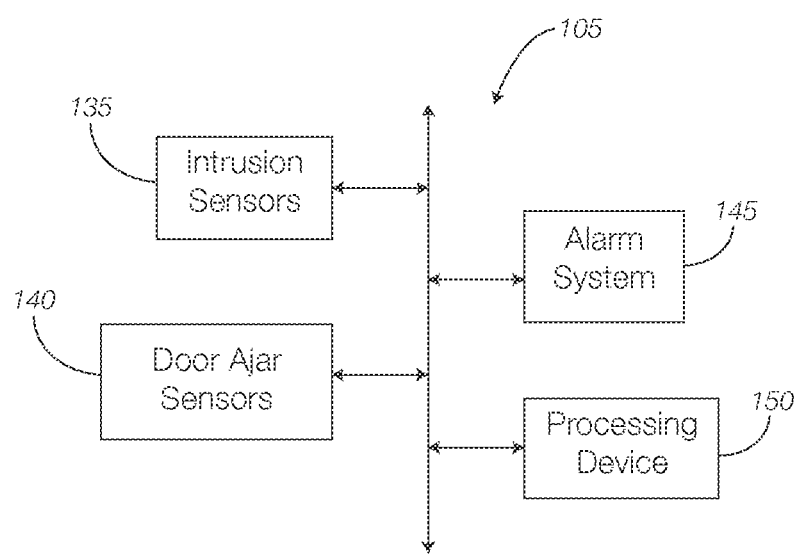
FIG. 2 is a block diagram of an exemplary vehicle system that may be incorporated into the vehicle of FIG. 1.

FIG. 2 is a block diagram of an exemplary intrusion detection system 105 that may be incorporated into the vehicle 100 of FIG. 1. As illustrated, the intrusion detection system 105 includes an intrusion sensor 135, a door ajar sensor 140, an alarm system 145, and a processing device 150.

The intrusion sensor 135 may be configured to detect the Doppler shift in the passenger compartment 110. For instance, the intrusion sensor 135 may include an ultrasonic sensor or a laser vibrometer configured to perform a Doppler scan in the passenger compartment 110 of the vehicle 100. The Doppler scan may include detecting a change in frequency of a wave for measuring sufficient vibration to cause a Doppler shift. Sufficient vibration may be caused by, e.g., opening a door 115, opening or breaking a window 120, or the like. The Doppler shift may be detected by the ultrasonic sensor or laser vibrometer and converted into an intrusion signal. The intrusion signal may represent, for example, the magnitude of the Doppler shift.

The door ajar sensor 140 may be configured to determine whether a door 115 has been opened. In some instances, the door ajar sensor 140 may include a switch or proximity sensor such as a Hall-effect sensor. The door ajar sensor 140 may be configured to output a door state signal. When the door 115 is closed, the door state signal may indicate a closed state (i.e., the door 115 is closed). When the door 115 is open, the door state signal may indicate an open state (i.e., the door 115 is open). The system may include any number of door ajar sensors 140. At least one door ajar sensor 140 may be disposed on each door 115. In addition, door ajar sensors 140 may be located placed on the hood 125, trunk 130, lift gate and possibly other locations throughout the vehicle 100 such as lockable storage compartments.

The alarm system 145 may be configured to output an audio, visual indication, UHF RF notification to the Key fob, or a Telematics notification of an attempt to access the vehicle 100 without authorization. For instance, upon receipt of an alarm signal from, e.g., the processing device 150, discussed below, the alarm system 145 may cause a horn of the vehicle 100 to beep, headlights and tail lights of the vehicle 100 to flash, or both, or it may send off a warning through wireless means to display on the Key fob, Phone, or to generate an email or SMS alert of the alarm event. In some instances, the alarm system 145 may be configured to transmit messages notifying the owner of the attempted unauthorized access. Thus, the alarm system 145 may be configured to generate and send a message according to any number of communication protocols.

The processing device 150 may be configured to receive the intrusion signal, compare the Doppler shift measured by the intrusion sensor 135 to a predetermined threshold, and activate the alarm system 145 if, for instance, the Doppler shift exceeds a predetermined threshold. The predetermined threshold may be set so that Doppler shifts caused by acts of unauthorized access to the vehicle 100 such as opening a door 115 or breaking a window 120 will trigger the alarm. In other words, the Doppler shift caused by such acts may exceed the predetermined threshold. Likewise, the predetermined threshold may be set to exclude acts that could cause a Doppler shift but are unrelated to an attempt to access the vehicle 100. For example, certain weather events such as high winds, hail, heavy rainfall or snowfall, or the like, may cause a Doppler shift. The predetermined threshold may be set to exclude such events so that the alarm is not triggered for weather related reasons or other reasons unrelated to attempts to access the vehicle 100 without authorization.

The processing device 150 may be further configured to determine whether to enable or disable the intrusion sensor 135, the door ajar sensor 140, or both. During a key-off cycle—that is, when the vehicle 100 is turned off—the processing device 150 may be configured to enable the intrusion sensor 135 and disable the door ajar sensor 140 if the customer sets the alarm system 145 to an armed mode. Thus, during the key-off cycle, the intrusion sensor 135 may act as both the theft deterrent system and sensor for cabin door ajar events. In this scenario the door ajar sensors 140 may be disabled to reduce the key-off load on the battery. After or if the enabled alarm has been triggered by an unauthorized cabin intrusion, the processing device 150 may enable the door ajar sensor 140 so that the state of the door 115, e.g., either opened or closed, can be detected prior to resuming normal operation of the vehicle 100. Accordingly, the door ajar sensors 140 may be enabled if the Doppler shift exceeds the predetermined threshold. Further, during a key-off cycle where all the doors 115 may be closed but the vehicle 100 has not been locked and the alarm system 145 has not been armed, and the processing device 150 has not been configured to enable the intrusion sensor 135, the door ajar sensors 140 shall remain in normal mode even if the unarmed vehicle 100 remains off for a prolonged period. Door ajar sensors 140, even if the vehicle 100 has five doors 110, collectively draw less key-off load than the intrusion controller 105 and sensors 135.

After the intrusion detection system 105 has determined that the cabin 110 has no occupants, other vehicle systems may be disabled to further reduce key-off load. For instance, circuits associated with the radio, garage door opener, seat control module, interior trunk release, parking brake, dome switches, clutch circuits, horn relay inputs, start/stop switch, hazard lights, head lamp switch, park lamp switch, liftgate open/closed switch, multi-function switch controls for, e.g., high beam and turn lights, etc., may be opened to prevent such systems from drawing a current while the vehicle is turned off. Further, the operation of some systems may be reduced instead of disabled. For example, the frequency of scanning the door ajar sensor or scanning any of the previously mentioned switches may be reduced while the intrusion detection system 105 is armed.

Figure 3:
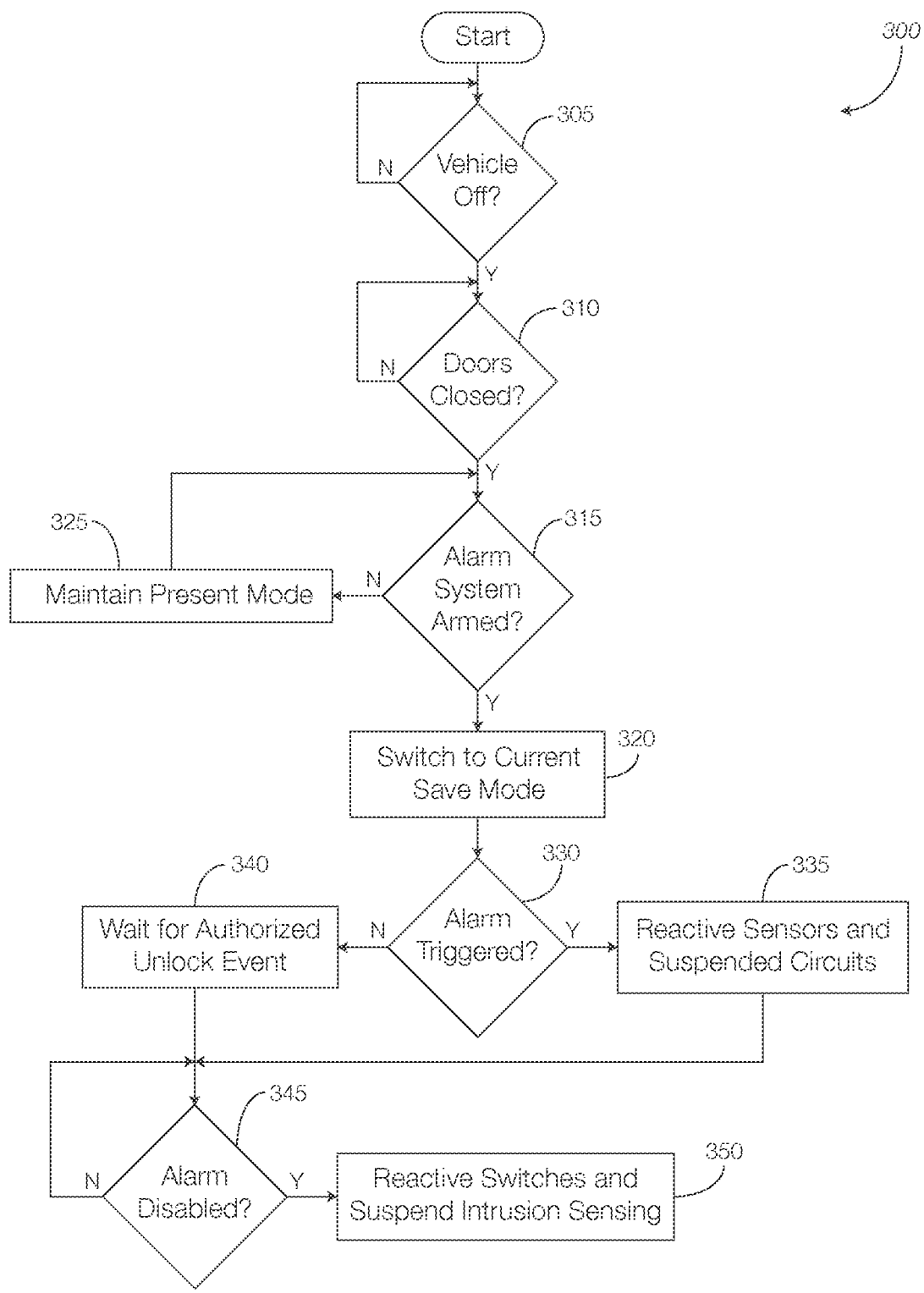
FIG. 3 is a flowchart of an exemplary process for using an intrusion sensor to detect whether a vehicle door is ajar.

FIG. 3 is a flowchart of an exemplary process 300 that may be implemented by one or more components of the vehicle 100 of FIG. 1, and in particular, the components of the intrusion detection system 105 of FIG. 2.

At decision block 305, the processing device 150 may determine whether the vehicle 100 is off. If so, the process 300 may continue at block 310. If the vehicle 100 is running, the process 300 may repeat block 305 until the vehicle 100 is turned off.

At decision block 310, the processing device 150 may determine whether the doors 110 of the vehicle 100 are closed. Whether the doors 110 are closed may be determined from signals output by the door ajar sensors 140. If the doors 110 are closed, the process 300 may continue at block 315. If one or more doors 110 are open, the process 300 may repeat block 310 until all doors 110 are closed. In some instances, an audible or visual signal may remind the driver or other occupant to close any open doors 110.

At decision block 315, the processing device 150 may determine whether the alarm system 145 has been armed. For example, the alarm system 145 may automatically become armed after, e.g., 20 seconds after the vehicle 100 is turned off and all doors 110 are closed. Alternatively or in addition, the alarm system 145 may become armed in response to a user input. If the alarm system 145 is armed, the process 300 may continue at block 320. Otherwise, the process 300 may continue at block 325.

At block 320, the processing device 150 may switch to a current save mode. That is, the processing device 150 may disable the door ajar sensors 140 and suspend various circuits and switches, as discussed above, to reduce the key-off load of the vehicle 100.

At block 325, the processing device 150 may maintain a present mode, which may include keeping the door ajar sensors 140 and various circuits and switches active.

At decision block 330, the processing device 150 may determine whether the alarm system 145 has been triggered. Determining whether the alarm system 145 has been triggered may be based on signals received from the intrusion sensors 135. As discussed above, the intrusion sensors 135 may output signals indicating that a Doppler shift has been detected. A Doppler shift may indicate that an unauthorized person is attempting to enter the vehicle 100. If the alarm system 145 has been triggered, the process 300 may continue at block 335. If the alarm system 145 has not been triggered, the process 300 may continue at block 340.

At block 335, the processing device 150 may reactivate the door ajar sensors 140 and any suspended circuits or switches. This way, the status of the doors 110 (e.g., either opened or closed) can be determined.

At block 340, the processing device 150 may wait for an authorized unlock event. An authorized unlock event may include receiving a signal from a key fob, a keypad, telematics, or the like, unlocking one or more doors 110.

At decision block 345, the processing device 150 may determine whether the alarm system 145 has been disabled. If so, the process 300 may continue at block 350. Otherwise, the process 300 may loop block 345 until the alarm system 145 is disabled.

At block 350, the processing device 150 may reactivate any suspended switches and suspend the intrusion detection system 105. After block 350, the process 300 may end or return to block 305.

In general, computing systems and/or devices may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
an intrusion sensor configured to detect a Doppler shift in a passenger compartment and output an intrusion signal representing the Doppler shift;
a processing device programmed to deactivate a door ajar sensor during a key-off cycle, receive the intrusion signal, and activate the door ajar sensor during the key-off cycle if the Doppler shift exceeds a predetermined threshold when an alarm system is armed.

2. The vehicle system of claim 1, wherein opening a door causes a Doppler shift that exceeds the predetermined threshold.

3. The vehicle system of claim 1, wherein breaking a window causes a Doppler shift that exceeds the predetermined threshold.

4. The vehicle system of claim 1, wherein the door ajar sensor is configured to detect whether a door has been opened and output a door state signal.

5. The vehicle system of claim 4, wherein the processing device is configured to enable the intrusion sensor and disable the door ajar sensor when the alarm system is armed and before the Doppler shift exceeds the predetermined threshold.

6. The vehicle system of claim 4, wherein activating the door ajar sensor if the Doppler shift exceeds the predetermined threshold includes activating the door ajar sensor to detect whether the door has been opened.

7. The vehicle system of claim 1, wherein the intrusion sensor includes an ultrasonic sensor configured to perform a Doppler scan in the passenger compartment.

8. The vehicle system of claim 1, wherein the processing device is configured to compare the Doppler shift to the predetermined threshold.

9. A vehicle system comprising:
a door ajar sensor programmed to detect whether at least one door has been opened, wherein the door ajar sensor is programmed to output a door state signal;
an intrusion sensor configured to detect a Doppler shift in a passenger compartment and output an intrusion signal representing the Doppler shift;
a processing device programmed to activate the intrusion sensor and deactivate the door ajar sensor during a key-off cycle, receive the intrusion signal, and activate the door ajar sensor if the Doppler shift exceeds a predetermined threshold to determine whether the at least one door has been opened.

10. The vehicle system of claim 9, wherein opening a vehicle door causes a Doppler shift that exceeds the predetermined threshold.

11. The vehicle system of claim 9, wherein breaking a vehicle window causes a Doppler shift that exceeds the predetermined threshold.

12. The vehicle system of claim 9, wherein activating the door ajar sensor if the Doppler shift exceeds the predetermined threshold includes activating the door ajar sensor to detect whether the at least one door has been opened.

13. The vehicle system of claim 9, wherein the intrusion sensor includes an ultrasonic sensor configured to perform a Doppler scan in the passenger compartment of the vehicle.

14. The vehicle system of claim 9, wherein the processing device is configured to compare the Doppler shift to the predetermined threshold.

15. A method comprising:
detecting a vehicle key-off cycle;
deactivating a door ajar sensor in response to detecting the vehicle key-off cycle;
measuring a Doppler shift in a passenger compartment of a vehicle;
comparing the Doppler shift to a predetermined threshold; and
activating the door ajar sensor during the key-off cycle if the Doppler shift exceeds the predetermined threshold.

16. The method of claim 15, further comprising:
enabling an intrusion sensor during the key-off cycle and while the door ajar sensor is deactivated.

17. The method of claim 16, wherein activating the door ajar sensor if the Doppler shift exceeds the predetermined threshold includes activating the door ajar sensor to detect whether at least one vehicle door has been opened.

18. The method of claim 15, wherein measuring the Doppler shift includes performing a Doppler scan in the passenger compartment of the vehicle.

\* \* \* \* \*